United States Patent [19]

Miner et al.

[11] 3,872,515
[45] Mar. 25, 1975

[54] RUBBER GLOVES

[75] Inventors: Kenneth G. Miner, Homer Township, Midland County; Jack L. Boone, Midland; Wilfred F. Talbot, Jerome Township, Midland County, all of Mich.

[73] Assignee: Dow Corning Corporation, Midland, Mich.

[22] Filed: Aug. 17, 1973

[21] Appl. No.: 389,276

[52] U.S. Cl. .................................................. 2/168
[51] Int. Cl. ............................................ A41d 19/00
[58] Field of Search .......... 40/2 R, 2 A; 2/167, 168; 260/46.5 G

[56] References Cited
UNITED STATES PATENTS

| | | | |
|---|---|---|---|
| 1,875,582 | 9/1932 | Foley | 2/168 X |
| 1,983,963 | 12/1934 | Belton et al. | 2/168 |
| 2,266,716 | 12/1941 | Robertson | 2/168 |
| 2,621,333 | 12/1952 | Thomas et al. | 2/168 |
| 2,984,596 | 5/1961 | Franer | 2/168 X |
| 2,989,755 | 6/1961 | O'Brien et al. | 2/168 |
| 3,127,363 | 3/1964 | Wick et al. | 260/46.5 G |
| 3,487,146 | 12/1969 | Tillotsov | 2/167 X |
| 3,555,564 | 1/1971 | Miskell et al. | 2/168 |
| 3,728,739 | 4/1973 | Semp | 2/168 |
| 3,740,262 | 6/1973 | Agostinelli | 117/94 |
| 3,761,965 | 10/1973 | Barasch | 2/167 |

FOREIGN PATENTS OR APPLICATIONS 1,297,196   5/1962   France ................................... 2/167

*Primary Examiner*—Geo. V. Larkin
*Attorney, Agent, or Firm*—Gordon Needleman

[57] ABSTRACT

This invention is directed at a surgical glove formed of a non-allergenic material such as the silicone rubbers, having a dried lubricant embedded in the inner surface thereof, having a label formed of the same material as that of the glove adhered thereto and having its cuff reinforced circumferentially by a tube of the same material from which it is formed.

2 Claims, 5 Drawing Figures

PATENTED MAR 25 1975 3,872,515

RUBBER GLOVES

BACKGROUND OF THE INVENTION

Non-Allergenic Feature

Surgical gloves are made of very thin rubber and are sized to provide a tight fit forming a skin-like sheath on the hand of the wearer. The objectives of surgical glove manufacturers are to provide a glove which will impart maximum tactile sensitivity to the wearer without impairing his facility of manipulation while at the same time protecting the patient from contamination or infection. Prior to the present invention surgical gloves were made either of rubber cement or latex.

Rubber cement gloves are made by dipping or otherwise depositing on a suitable form a solution of pure gum of dry para, smoked sheet or pale crepe type. The dipping or other means of deposition is repeated a relatively large number of times to place a deposition on the form of sufficient thickness. The rubber cement solution is made by dissolving milled rubber in a petroleum distillate solvent. After each disposition it is necessary to allow the solvent to evaporate prior to the next deposition. It is frequently necessary to deposit and evaporate the solvent as many as seven or more times in order to build a glove of sufficient thickness. The glove is then cured by subjecting the coated form to surrounding fumes of a curing agent such as sulfur monochloride and then neutralize the curing agent with ammonium. The sulfur monochloride curing process is not considered satisfactory because of the difficulty of controlling the vapor concentration and therefore the difficulty of controlling the amount of cure. The use of sulfur monochloride was introduced because of the impracticability of incorporating curing agents directly into rubber cement.

Latex gloves may be formed by dipping or otherwise depositing a dispersion of natural rubber latex on an appropriate form. The dispersion may also contain a vulcanizing agent such as sulfur along with accelerators and preservatives. After each deposition on the form an acid coagulant is applied to the deposition until it reaches the required thickness. Following each treatment with the coagulant the deposit is washed to neutralize and remove excess coagulant.

Both latex and rubber cement gloves may have an adverse reaction to the skin of the wearer. Approximately 2% of all surgeons and medical personnel who wear surgical gloves suffer from some type of dermatitis caused by an allergy or sensitivity to the rubbers. It appears that rubber cement is somewhat less allergenic than latex. Although rubber cement gloves are less likely to cause an allergic reaction than latex gloves, the latex glove is physically stronger and stands up better to repeated application of live steam.

Application of Dry Lubricant to the Internal Surface of a Surgical Glove

Because of their skin tight fit and the nature of the materials from which they are made dry lubricants have been used to permit surgical gloves to be easily placed on the hands of the wearer and to prevent them from sticking together when packaged.

Originally talcum powder or talc was used as a dry lubricant. Talc even in the form of the finest dusting powder is revealed under the microscope as sharp needle-like particles interspersed with thin platelets having sharp pointed corners. Talc has been known to irritate skin when brought into contact with it and has even been known to irritate the comparatively tough skin of the human hand. Despite the most elaborate precautions talc is often introduced into the living body by medical personnel wearing surgical gloves which have been dusted with it. It is well known that talc cannot be absorbed by the living body. The report of Antopol (*Lycopodium Granuloma*, Arch. Path. 16, Page 326 [1933]) indicated that talc adversely affects the living body by causing lesions (i.e., adhesions, granulomas, etc.). Since publication of this report the use of talc as a surgical glove dusting powder has been abandoned and replaced by the use of starch powders. Although there is some evidence that starch powders do not cause adhesion a few authorities maintain that granuloma occurs in surgical wounds as a result of starch powder contamination. In spite of the question raised regarding the safety of starch powder as a dry lubricant for surgical gloves, it is still in general use throughout the medical world. In an effort to overcome the disadvantages of talc and starch dusting powders inventors have proposed the use of a finely divided polyglycolic acid powder as disclosed in U.S. Pat. No. 3,728,739 issued Apr. 24, 1973, or the use of finely divided insoluble sodium metaphosphate as disclosed in U.S. Pat. No. 2,621,333 issued Dec. 16, 1952. These alternative powders are much more expensive than starch powders.

Construction of Surgical Glove Cuff

In the practice of most surgical and many medical techniques the outer surface of surgical gloves worn by doctors and their assistants must be maintained free of contamination. Normally, the gloves are packaged, sterilized in an autoclave under live steam at a temperature of 250°F. or sterilized using a gas such as ethylene oxide. In the package the cuffs of the glove are turned back toward the hand portion and inside out. Prior to surgery, for example, the doctor scrubs his hands making them as aseptic as possible. After the scrub an assistant, if he is available, will grasp the cuff of the glove on opposite sides opening it to allow the doctor to thrust his hands into the glove without contacting the outside surface. Where, as is true in many cases, no assistant is available the doctor places the gloves on his own hands. Most techniques for placing the gloves on the doctor's hands apply considerable strain on the cuff portion of the glove adjacent its opening. The cuff is also elastically engaged with the loose and bulky material of the doctor's surgical gown slightly above the wrist portion. It is important that the glove cuff remain in place about the gown sleeve throughout the operation the doctor is performing in order to insure that any portions of the gown sleeve that may have been touched by a bare hand as the glove is being donned remains covered by the cuff portion of the glove and to confine the bulky portion of the sleeve far enough up on the doctor's arm so that it does not interfere with the operation in any manner.

An early method of forming the opening of the cuff was to roll a portion of the wrist area of the glove upon itself before the glove is completely cured providing a circumferential bead. Another approach was to cement a flat band of rubber adjacent the end of the cuff providing in effect a bead and also because of its width preventing the glove cuff from rolling up on itself. In the patent to Miskell, U.S. Pat. No. 3,555,564 issued Jan. 19, 1971 several circumferential bands are spaced from the bead of the cuff to hold the cuff on the sleeve of the gown during an operation.

Labeling

Because of the necessity of carrying an inventory of various sizes of gloves it is necessary that they be identified by some form of label. One method of labeling as disclosed by the patent to Auzin, U.S. Pat. No. 2,152,725 issued Apr. 4, 1939 indicates a method of labeling a glove by placing an ink stamp on the glove when it is partly formed and then dip coating over the stamp. In some cases labeling has been accomplished by stenciling, decalcomania transfers and adhesive tags. In the patent to Franer, U.S. Pat. No. 2,984,596 issued May 16, 1961 an ink receptive vulcanizable layer with embedded indicias is adhered to "green" or unvulcanized tubing and is then vulcanized and a carrier web of the vulcanizable layer is removed. In the patent to Foley, U.S. Pat. No. 1,875,582 issued Sept. 6, 1932 a method of cold vulcanization is shown for placing an identification label on rubber goods.

SUMMARY OF THE INVENTION

The surgical glove disclosed by this invention is formed of a non-allergenic material such as silicone rubber having a dry lubricant embedded in the inner surfaces thereof. Embedding the dry lubricant or dusting powder will prevent loose powder from entering into the living body either directly from the gloves or from powders which fall on instruments and will allow gloves to be reused without the necessity of further internal dusting.

Natural emulsifiers or emulsifiers used for dispersion in the dipping process or ingredients remaining after the coagulant step may act as a skin irritant in gloves formed of latex. The use of silicone rubber avoids these allergens.

By using a tube of silicone rubber as the foundation for the bead of the cuff of the glove the inventor has assured that the non-allergenic feature is retained throughout the glove construction and has also assured a substantial permanent bond between the bead foundation (i.e., the rubber tubing) and the glove proper. The use of labels formed of biologically inert silicone rubbers having printing using silicone based inks retains the non-allergenic integrity of the glove.

The primary object of the invention is to provide non-allergenic surgical gloves. The object is achieved by forming the glove of a silicone rubber.

Another object of the present invention is to provide a surgical glove having a dry lubricant embedded or adhered to its inner surface.

A still further object of the present invention is to provide a bead cuff termination having a tubular foundation.

Another object ot the invention is to form the tubular foundation of the same material as the glove; namely silicone rubber.

Yet another object of the present invention is to label a silicone rubber glove with a label formed of silicone rubber and imprinted with silicone based inks.

BRIEF DESCRIPTION OF THE DRAWINGS

Other objects and attendant advantages of the present invention will become obvious to those skilled in the art from a reading of the following detailed description when read in conjunction with the accompanying drawings wherein.

DESCRIPTION OF PREFERRED EMBODIMENTS

Figure 1:
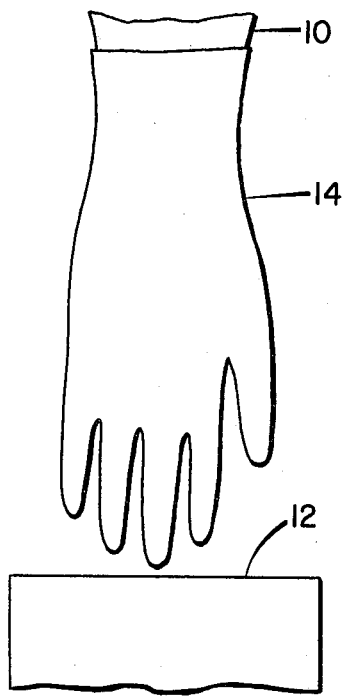
FIG. 1 is a side elevation showing the glove form and a dipping tank, broken away, after the form was dipped in a dispersion of silicone rubber.
Figure 2:
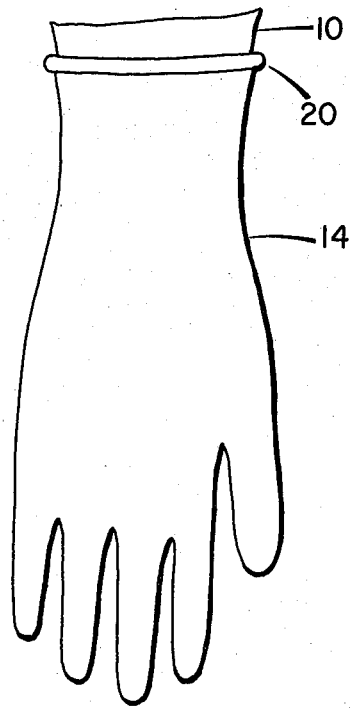
FIG. 2 is a side elevation showing the form and a partially formed glove after addition of the cuff bead.
Figure 3:
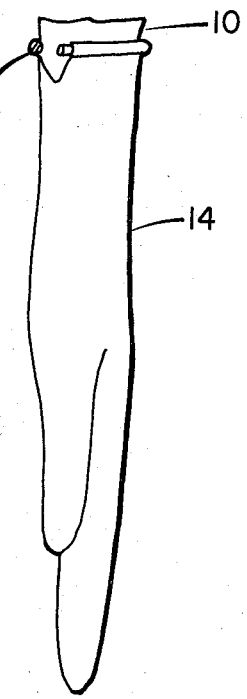
FIG. 3 is a side elevation showing the form and a partially formed glove with a portion of the cuff bead broken away.
Figure 4:
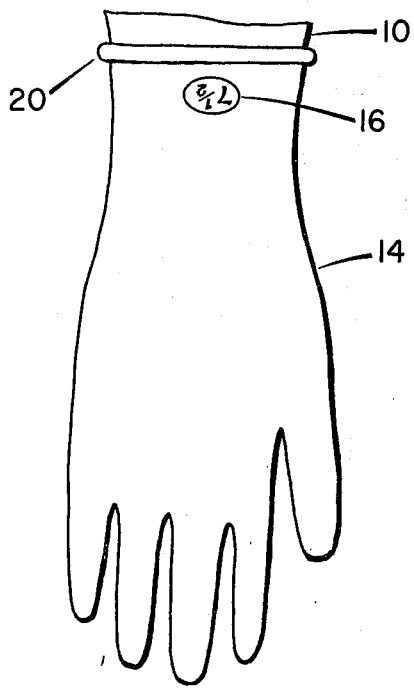
FIG. 4 is a side elevation showing the form and a glove after adherence of the label.
Figure 5:
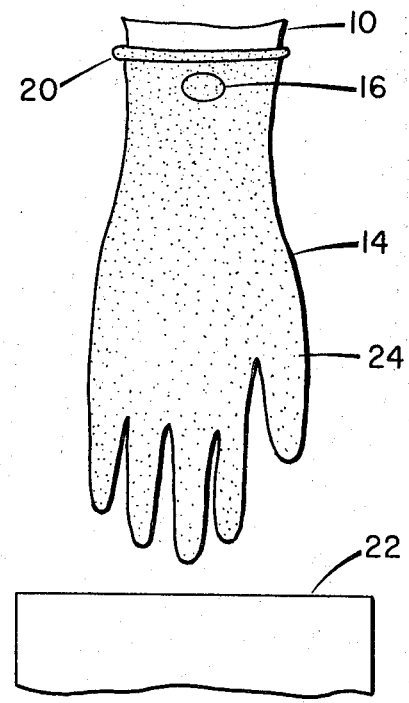
FIG. 5 is a side elevation of the form and glove after application of a lubricating powder and a side elevation of a dipping tank, broken away.

A seamless, surgeon's glove is formed according to the invention by dipping a group of spaced commercially available porcelain glove forms 10, having a release coating of Teflon, into a tank 12 containing a dispersion of base polymer in a chlorinated solvent (trichloroethane). The dispersion comprises about 12-14% by weight of base polymer. A cross-linking agent such as a platinum catalyst is added to the dispersion at the time it is placed in the dipping tank although other cross-linking agents or catalysts can be used. Generally speaking the silicone rubbers which may be used to form the glove have as a base polymer an organopolysiloxane and utilize either benzoyl peroxide, dichlorobenzoyl peroxide or other vulcanization systems that may be preferred. Either pure polydimethylsiloxane or polydimethylsiloxane having a small amount (up to about .5 mole percent) of methylvinylsiloxane units would provide excellent base polymers. Fillers may also be used in the rubber composition to increase tensile strength and reinforcing silicone fillers such as fumed silicas, silica aerogels, silica xerogels and certain treated silicas are satisfactory for this purpose having been shown to be inert to animal fluids and tissues.

The patent literature showing the preparation of silicone rubbers which may be used to form the glove is extensive. Illustrative patents include Warrick U.S. Pat. No. 2,541,137; Konkle et al. U.S. Pat. No. 2,890,188; Youngs U.S. Pat. No. 2,723,966; Tyler U.S. Pat. No. 2,863,846; and Johannson U.S. Pat. No. 3,002,951.

Automatic hydraulic controls, well known in the art, are used to control the rate of immersion annd withdrawal as well as the period of submersion. The length of time of submersion and the number of submersions determines the glove thickness. The preferred thickness is from about .008 to .012 inches. The coating 14 on the forms is air dried after each submersion assuring that the trichloroethane is evaporated, which takes approximately 20 minutes depending on thickness. The label 16 is applied to the coating 14 after the last deposition has air dried approximately 15 minutes by placing it printed side first on the outer surface of the partially formed, uncured, tacky glove. The label is formed from a silicone rubber sheet having the necessary information printed on one side using silicone based inks. A ring 18 of silicone rubber tubing having an ID of approximately .040 inch and OD of approximately .080 inch, cut to the proper length, is fitted circumferentially around the wrist of the partially formed glove at the time the label is placed thereon. The ring 18 is formed by chemically swelling one end of the tubing and slipping it over the other end of the tubing. The swelled end will contract securely fastening the two ends together. The ring is then dropped over the coated form adhering it to the partially formed glove adjacent the end of the wrist and then is manually rolled one turn with the wrist coating enclosing the tubing in the cuff of the glove to form a bead 20. Similar silicone rubbers used to form the glove are used to form the label and the ring. After the desired thickness is reached the coated form is then submerged in a tank 22 containing a bed of sterilizable corn starch powder or other acceptable dry lubricants such as wheat starch, zinc oxide, or talc which is occasionally agitated by a jet of air. The powder 24 will become embedded by having at least a portion penetrating below the outer surface of the still tacky, uncured surface of the glove and will be bonded in a substantially permanent manner to the glove when the assemblage is cured. In order to cure the gloves they are placed in a curing oven having a temperature of 270°F. in a standard air atmosphere for about an hour. After they are removed from the oven they are stripped from the form placing the coated surface of the glove on the inside. The smooth, high friction outer surface of the silicone rubber glove will provide a better gripping surface for the surgeon during medical procedures even though the glove may be partially covered with blood or other slippery substances.

That which is claimed is:

1. A silicone rubber glove having a hand portion of thin wall section to cling closely to the wearer's hand and transmit a maximum of touch sensitivity therethrough and having an open end cuff portion, the hand portion having an inner surface with a lubricity imparting quantity of a dusting powder embedded therein.

2. A silicone rubber glove having a hand portion of thin wall section to cling closely to the wearer's hand and transmit a maximum of touch sensitivity therethrough and having an open end cuff portion, the hand portion having an inner surface with a lubricity imparting quantity of a dusting powder adhered thereto.

* * * * *